UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

SULFITE-LIQUOR PRODUCT AND PROCESS OF PRODUCING SAME.

1,311,215.   Specification of Letters Patent.   Patented July 29, 1919.

No Drawing. Application filed July 17, 1913, Serial No 779,516. Renewed June 13, 1918. Serial No. 239,882.

*To all whom it may concern:*

Be it known that I, CARLETON ELLIS, a citizen of the United States, and a resident of Montclair, in the county of Essex and State of New Jersey, have invented certain new and useful Improvements in Sulfite-Liquor Product and Processes of Producing Same, of which the following is a specification.

This invention relates to a binding material prepared from waste sulfite cellulose liquor and is a continuation in part of or contains matter disclosed in my copending application Serial No. 735,393, filed December 7, 1912, (now Patent 1,068,048).

My invention specifically relates to the production of a binder consisting of or containing waste sulfite cellulose liquor solids in the form of a powder or granular fragmentary material or in paste form in such a condition as to be readily soluble in water so that the material may be reduced or dissolved in water to make a solution of the desired density and viscosity.

Sulfite cellulose liquor although a fairly stable body when concentrated to a syrup 30° Baumé or so, is, however, when dried to a solid material such as a powder (by any methods heretofore known) likely to undergo undesirable changes which render it insoluble or prone to become insoluble in storage.

My invention is particularly directed toward the production of a stable dry composition comprising waste sulfite cellulose liquor solids, such binder composition being sufficiently stable so that it may be packed in barrels such as flour barrels which are more or less pervious to air and may be stored or shipped in such pervious packages for weeks or months without becoming insoluble to any material extent.

In preparing the material to this end I may for example take waste sulfite cellulose liquor and concentrate it preferably after largely freeing it from such content of lime or other material which may tend to clog such concentrating apparatus. By this I do not mean that I ordinarily entirely remove all mineral bases which are present, but that preferably I endeavor to eliminate such proportion as may be precipitated to an undesirable extent during the concentration.

The liquid is evaporated in an acid condition, without previously neutralizing or substantially neutralizing the acidity. In a preferred form of execution of the process, the liquor is preferably concentrated after its normal acidity has been reduced almost or actually one-half by the addition of lime or other basic material. The concentration of the solution may be carried out with fully acid material and if desired the semi-acid material subsequently prepared, but it is preferable to carry out the concentration with semi-acid material as the product in the dry form which is subsequently derived is desirably stable.

Instead of concentrating to a syrupy body of say 30° Baumé which is about the strength of the initial liquor in the market and used as a binding material, I carry the concentration much further removing preferably almost the entire content of water, preferably doing this in the presence of small quantities of oxygen to produce a solid product.

The product is a finely granular or pulverulent material, or it may be coarsely granular or fragmentary and is readily soluble in water although normally is preferably not prepared so as to be excessively soluble like ordinary sulfite liquor and the semi-acid material although originally soluble and stable in the dry form, has the property when prepared by the preferred method of becoming more or less insoluble on protracted exposure to air and moisture, so that it may be used to advantage as a binder for road beds and road surfaces, for making briquets out of coal, iron ore and the like, as a core compound and for many other purposes for which a binding element is desired.

In a field entirely apart from that of adhesive and binding materials, namely in the tanning industry, the product may also be employed, especially in the semi-acid or acid form and has the advantage of ease of shipment as a dry powder in contrast to the difficulties of shipping and handling the liquid sulfite liquors. The use of this material in tanning is claimed in my copending application 162,941, filed April 18, 1917.

The sulfite liquor may be entirely freed from lime and combined with aluminum, chromium or other material useful in tanning operations and the aluminum or chromium neutral or acid lignosulfonate may be concentrated to produce a powder or solid which can be taken up in water and form a tanning agent.

Application of the binding material will, however, be described in reference particularly to its application to roads and road surfaces.

In applying my product to the treatment of a road surface preferably I dust the surface with the finely granular or pulverulent product and then sprinkle the roadbed with water. As each granule of the binding material slowly dissolves, it forms a zone of concentrated liquor in the adjacent region, while this gradually tapers off to a weak solution or content of sulfite liquor which property tends to prevent the heretofore experienced difficulty of crusting.

The binding material in dry form may be applied by means of a distributer attached to the front of an ordinary watering cart so that immediately after the application of the binder to the road, the water is applied to bring about cementation. On the other hand, very desirable results may be secured by dusting the road with the dry binder and rolling same before sprinkling. This secures a road surface of a somewhat different texture from that obtained when ordinary sulfite liquor is sprinkled on the surface.

It is well nigh impossible to roll into the surface the liquid sulfite liquor to afford the results which are obtained by rolling the dusted road surface in this manner which, of course, may be previously dampened if desired and then thoroughly sprinkling the road to bring about the final cementation.

Another feature of the use of a dry binder is that one may deliver a larger portion of the binder on that portion of the road where traffic is heaviest. A distributer may be provided which discharges a larger amount along the wheel track portion of the road. A roller may then follow to press this into the surface and on sprinkling the special effect desired is secured.

It is obvious that the local application of liquids in this manner offers many difficulties which do not obtain with the dry binder.

Various additions may be made to the dry binder either during or after concentration to that form. After concentration to a thick material powdered quicklime sometimes may be added to absorb the moisture present and to afford a dry powder without further concentration, the powder usually being of decreased solubility.

All kinds of fillers such as talc, kieselguhr, fullers' earth and the like may be added to the partially concentrated liquor so as to form a nucleus during the concentration to dryness and also weight the particles so that the product may be applied in windy weather without loss.

A useful addition to the liquor is that of silicate of soda (sodium silicate) or its equivalent. The addition of 5 or 10% more or less of silicate of soda prior to final concentration yields a valuable product in spite of the fact one might expect a tendency to the formation of silicate of lime (calcium silicate). It is, however, just as feasible or better to mix the dry pulverized sulfite crude lignosulfonate binder with dry silicate of soda in powder form using about 5 to 10% of the latter more or less and dust the road with this mixture, subsequently sprinkling same.

In addition to the semi-acid oxidized material other binders derived from sulfite liquor may be employed, as also any equivalent substance and I do not limit myself herein to the precise materials or procedure employed, but may invoke the doctrine of equivalency in so far as same is herein applicable. By the use of two binding agents together, in this manner (e. g. the sulfite binder and the silicate of soda) each acts to supplement and assist the other.

In making the road bed the road material may be mixed with dry binder in the proportion of say 1% or more according to the nature of the road material and the road built up course by course in the usual way, the number and character of the courses depending upon the degree of elaboration of the roadbed required. When the road is moistened, each particle of the binder furnishes a zone decreasing in concentration from the surface of the particle outward through the earthy mass and this undulation of concentration apparently prevents the trouble heretofore experienced in some instances of scaling and crusting.

Ordinary Portland cement or concrete mixture may receive additions of the dry binder and be worked up into a mortar in connection with the making of so-called cement or concrete road beds.

The water employed in moistening the roadbed may be charged with any suitable chemical such, for example, as calcium or magnesium chlorid, sodium silicate, molasses and black strap or emulsions of oil. Similarly the road surface may be coated with bitumen or the road structure may be suitably impregnated with oil or bitumen and the like.

A feature of the road treatment previously in part set forth is that the powdered binder may be distributed through the road soil so that the particles are separated more or less, but nevertheless are closely adjacent, and furnishing when moistened points of high concentration of sulfite liquor solids, which diffuse away from these points into the earth round about and furnish zones of decreasing concentration from such points outwardly. Thus by having the particles closely adjacent, over-lapping zones of varying concentration may be secured and this irregularity of distribution often as stated tends to overcome the objection of crusting which has been heretofore experienced to some extent with sulfite waste liquor.

When oil is used as a surface coating if desired a quantity of the powdered sulfite waste liquor may be added thereto. Similarly if oil is incorporated with the courses of the road themselves, such oil may contain powdered or granular sulfite waste liquor. On the other hand, the sulfite waste liquor may contain oil or other waterproofing material such as calcium stearate and the like in order that the granules of the binder may be given a definite resistance to the solvent action of the water so that the particle or granule of the sulfite liquor remains for a long time in part undissolved, acting as a source of supply of sulfite liquor to the adjacent soil and thus enabling continuance of effect which is not easily secured in any other way.

The addition of 10 to 15% of petroleum oil such as asphaltic oil suffices to accomplish this result, yielding a product which affords high permanence even in the dampest climates. In normal climates 3 to 5% of oil or 1% or so calcium stearate suffices to secure this effect. The oil may be added to the liquor after the latter has been concentrated to a thick syrup when the product may be reduced to dryness and pulverized.

In making core compounds for foundry use the dry powder may be incorporated with the dry or slightly damp core sand and the mixture sprinkled with water and well agitated. Or the sulfite liquor solids may be dissolved in water and the coarse sand tempered with this solution; or this sulfite liquor may be applied in any other suitable manner.

In the manufacture of briquets from culm or iron ore or the like, the dry binder may be merely incorporated with the dry material and the mixture afterward wetted. Only a very small percentage of the binder is required to secure effective results, much less than 1% being ordinarily required; while with syrupy sulfite liquors prepared by simple concentration of sulfite liquor, especially of neutralized sulfite liquor, to a density of 30° Baumé or thereabout, the binding quality appears to be deficient, relatively speaking, due no doubt to a colloidal condition which is factitious and which is largely or partly destroyed by reducing to dryness, so that a solution subsequently prepared from the dry product shows a penetration and ease of admixture which does not obtain with the concentrated syrup under like conditions, especially when working with solutions of fairly high concentration.

By using less water than is required for complete solution, etc., a paste is formed which may be incorporated with the material to be cemented.

It may be stated that in some instances, the solid product dissolved in water produces a solution having 10 to 50% less viscosity than the original sulfite waste liquor, of the same density. Finished briquets or other shaped articles (perhaps on account of this fact) made with the binder of the present invention are likely to show less shrinkage, fewer hair lines or cracks and greater stability in storage and under service conditions, than most of the older varieties of briquets.

What I claim is:

1. A binder comprising strongly-acid waste sulfite cellulose liquor solids in a pulverulent form soluble in water, stable on exposure to air in a dried condition and becoming gradually insoluble when subjected to a protracted exposure to air in the presence of moisture.

2. A binder comprising strongly-acid sulfite cellulose liquor solids in a non-fluent form, soluble in water, stable on exposure to air, while said solids are in a dried condition and becoming gradually insoluble when subjected to a protracted exposure to air in the presence of moisture.

3. A binder comprising strongly-acid sulfite cellulose liquor solids in a non-fluent form, soluble in water, and stable on exposure to air in a dried condition.

4. A binder comprising water soluble waste sulfite liquor solids in a pulverulent form having their normal acidity substantially half neutralized and containing ingredients of sulfite cellulose liquor normally unstable upon exposure to air, in a substantially stable condition.

5. A binder comprising water soluble waste sulfite liquor solids in a non-fluent form and in a strongly acid condition and containing ingredients of sulfite cellulose liquor normally unstable upon exposure to air, in a substantially stable condition 6. A binder comprising sulfite cellulose liquor solids in a non-fluent form, and in a strongly acid condition containing ingredients of sulfite cellulose liquor normally unstable upon exposure to air, in a substantially stable condition, the composition being soluble in water.

7. A composition of matter comprising solid constituents of waste sulfite cellulose liquor which has its normal acidity reduced but not entirely neutralized, in admixture with a soluble silicate.

8. A binder composition, comprising solid constituents of waste sulfite cellulose liquor, which has its acidity reduced substantially one-half.

9. The herein described process of producing a binder composition, which comprises reducing the normal acidity of waste sulfite cellulose liquor and still leaving the liquor substantially acid, and evaporating the acid liquor for concentrating the same into a solid condition.

10. The process which comprises neutralizing about one-half of the normal fixed acidity of sulfite waste liquor, and evaporating the liquor to dryness.

11. A composition of the character described, comprising finely divided solid water-soluble constituents of waste sulfite cellulose liquor, said solids having a substantial part only of the acidity of the original waste liquors.

12. A composition of the character described, comprising pulverulent readily water-soluble solid constitutents of waste sulfite cellulose liquor having its normal solidity substantially reduced and remaining substantially acid.

13. A composition of the character described, comprising finely divided readily water-soluble solid constituents of waste sulfite cellulose liquor having its normal acidity reduced approximately one-half.

14. The herein described process of treating waste sulfite cellulose liquor which comprises neutralizing a substantial part of the acidity of said liquor, but leaving the liquor substantially acid, and thereafter evaporating the said liquor substantially to dryness, so that the product remains water-soluble.

15. The herein described process of producing a binder composition, which comprises partially neutralizing the normal acidity of waste sulfite cellulose liquor while still leaving the liquor substantially acid, and evaporating the acid liquor to a solid condition.

16. As a new product of manufacture, dried sulfite cellulose waste liquor solids in a substantially acid state.

17. As a new product of manufacture, sulfite cellulose waste liquor solids in the form of a dry powder in a substantially acid state.

18. A composition of matter comprising sulfite cellulose waste liquor solids of an acid character in a dry pulverulent form mixed with dry sodium silicate.

19. As a binding agent, sulfite cellulose waste liquor solids of an acid nature, and sodium silicate, both in a dry pulverulent form.

20. As a binding agent, sulfite cellulose waste liquor acid solids in a dry pulverulent form, and a water soluble silicate mixed therewith.

21. A pulverulent form of waste sulfite cellulose liquor solids containing a part only of the acidity of the raw liquor admixed with a water soluble silicate.

22. As a binder, powder consisting of waste sulfite liquor solids of an acid nature and from 5 to 10 per cent of sodium silicate.

23. A composition of matter comprising sulfite cellulose waste liquor acid solids in a dry pulverulent form mixed with other binding agents.

24. As a binding agent, sulfite cellulose waste liquor acid solids in a dry pulverulent form, and another water-soluble binder mixed therewith.

25. A new product of manufacture comprising substantially acid waste sulfite cellulose liquor solids in a pulverulent form, soluble in water, substantially stable on exposure to air in a dried condition and becoming gradually insoluble when subjected to a protracted exposure to air in the presence of moisture.

26. A new product of manufacture comprising substantially acid sulfite cellulose liquor solids in a non-fluent form, soluble in water and stable on exposure to air in a dried condition.

27. A dry form of sulfite waste liquor solids of a distinctly acid character, said product being characterized by the fact that its aqueous solution has a lower viscosity than raw sulfite waste liquor of like specific gravity.

28. As a new article of manufacture, dried sulfite cellulose waste liquor solids in a finely divided state, said product containing a considerable part, but not all, of the normal acidity of the original liquor.

29. As a new product, sulfite cellulose waste liquor in a dry condition, said product having a substantial part, but not approximately all of the acidity of the original liquor from which said product has been produced.

30. Sulfite cellulose waste liquor solids, having the original acidity substantially reduced but not substantially entirely neutralized, the same being in a dry condition.

31. The process of treating cellulose sulfite waste liquor which comprises eliminating a material part, but not approximately the entire amount of the original acidity and concentrating the liquor of reduced acid content.

Signed at Montclair in the county of Essex and State of New Jersey this 15th day of July, A. D. 1913.

CARLETON ELLIS.

Witnesses:
B. M. Ellis,
Paul A. Hoandarg.

Copies of this patent may be obtained for five cents each, by addressing the "Commissioner of Patents, Washington, D. C."